Aug. 26, 1941.　　O. E. NORBERG　　2,253,804
REFRIGERATOR
Filed Jan. 18, 1940　　2 Sheets-Sheet 1

INVENTOR.
OSCAR E. NORBERG.
BY
Carroll R. Taber
ATTORNEY.

Aug. 26, 1941.  O. E. NORBERG  2,253,804
REFRIGERATOR
Filed Jan. 18, 1940   2 Sheets-Sheet 2
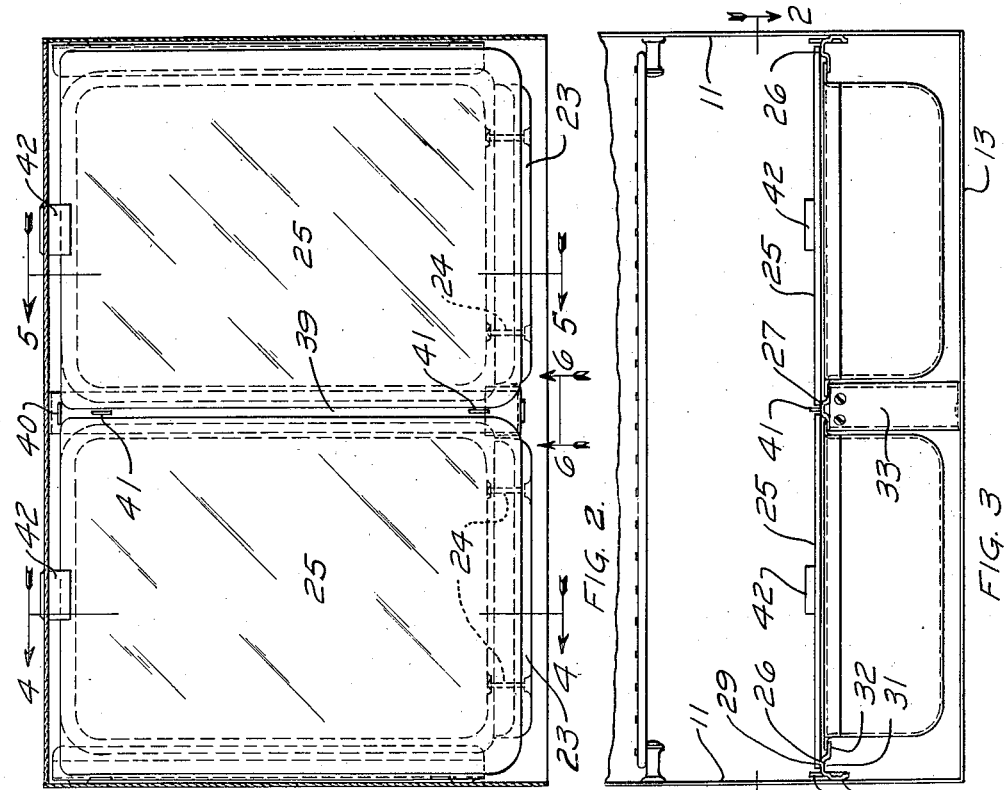
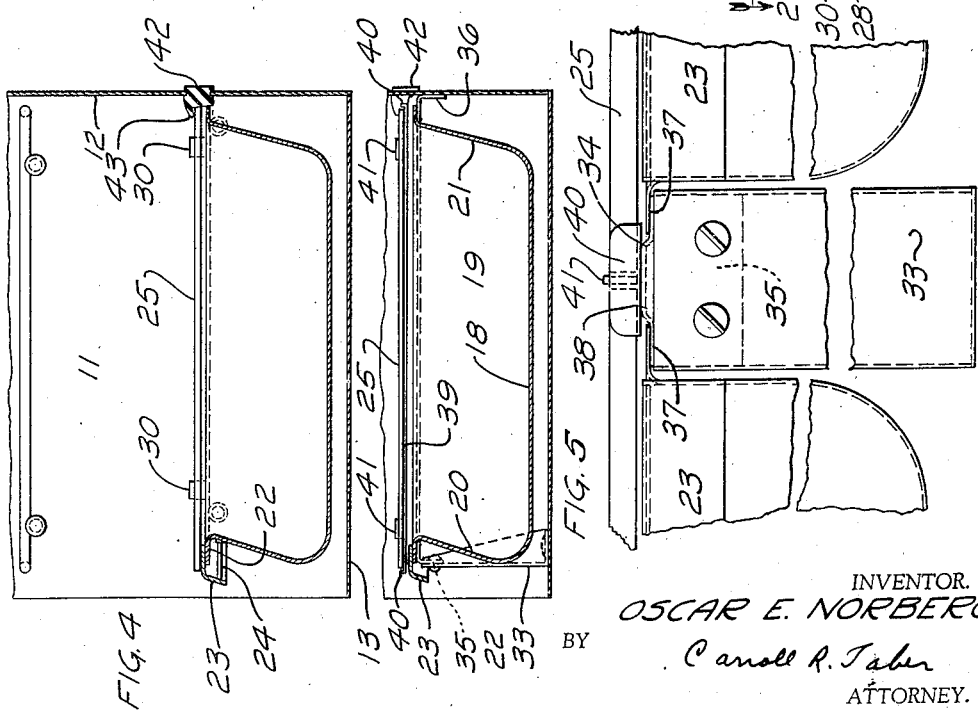
INVENTOR.
OSCAR E. NORBERG
BY Carroll R. Taber
ATTORNEY.

Patented Aug. 26, 1941

2,253,804

UNITED STATES PATENT OFFICE 2,253,804

REFRIGERATOR

Oscar E. Norberg, Greenville, Mich., assignor to Gibson Electric Refrigerator Corporation, Greenville, Mich., a corporation of Michigan Application January 18, 1940, Serial No. 314,416

5 Claims. (Cl. 312—150)

This invention relates to refrigerators and more particularly to vegetable pans for use therein and the arrangement of the supporting means for such vegetable pans.

It is an object of this invention to provide a vegetable pan of attractive appearance having a capacity greater than that usually obtained in pans of similar overall dimensions. Another object is the provision of resilient means on the interior of a cabinet which serves as a stop for a removable receptacle and separate cover therefor and also as means for holding the cover in closed relation to the receptacle. A still further object is the provision of a novel form of common supporting structure on the interior of a refrigerator cabinet for a pair of removable receptacles and covers, which supporting structure includes means for maintaining the covers and receptacles in spaced relation to each other.

For a more detailed description of the invention, reference is now made to the following specification and accompanying drawings, wherein—

Figure 2 is a horizontal cross-sectional view of the refrigerator lining taken on a plane slightly above the vegetable pans;

Figure 3 is a fragmentary front elevational view of the structure shown in Figure 2;

Figure 4 is a fragmentary cross-sectional view taken on substantially the line 4—4 of Figure 2;

Figure 5 is a fragmentary cross-sectional view taken on substantially the line 5—5 of Figure 2; and Figure 6 is a fragmentary front elevational view of a portion of the structure shown in Figure 2 and taken on substantially the line 6—6 thereof.

Figure 1:
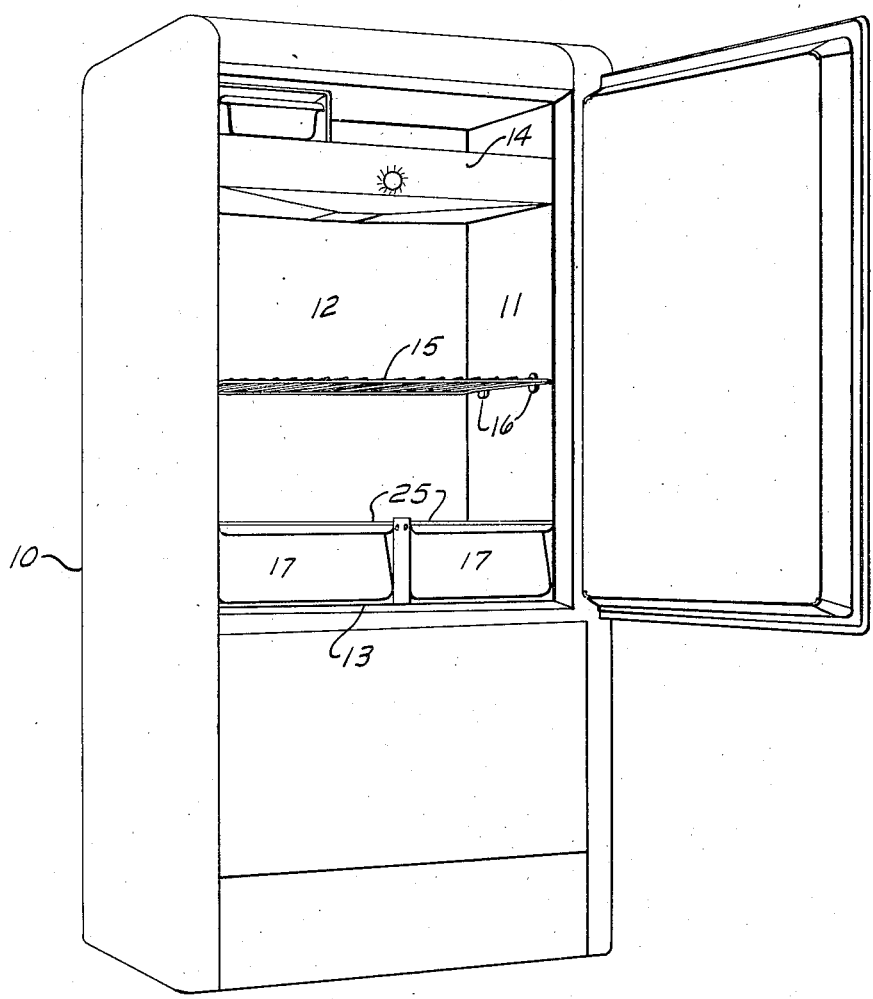
Figure 1 is a perspective view of a refrigerator cabinet embodying this invention, the door of the refrigerator being open to show the interior of the cabinet.

A refrigerator embodying this invention is shown in Figure 1. The refrigerator comprises a cabinet 10 having an interior lining including side walls 11, a back wall 12, and a bottom wall 13. In the upper part of the refrigerator is a cooling unit 14. Intermediate the top and bottom of the refrigerator is a shelf 15 mounted on suitable supports 16 secured to the side walls 11. In the lower part of the lining is a pair of identical vegetable pans 17 and covers 25 therefor. The pans and their covers are shown more in detail in Figures 2 to 6.

Each pan 17 is preferably drawn from a single sheet of metal. It consists of a bottom wall 18, a pair of upstanding side walls 19, a front wall 20, and a rear wall 21. Surrounding the pan and located at its upper edge is an outwardly extending continuous peripheral flange 22. Mounted on the front portion of the peripheral flange 22 is a handle 23 of angular cross-section. The handle 23 is preferably attached to the vegetable pan 17 by means of a pair of bolts 24.

The flange 22 at the rear of the pan 17 and the front edge of the handle 23 define the maximum overall length of the vegetable pan 17. This dimension must be somewhat less than the depth of the refrigerator cabinet when the door is closed. Therefore, in order to provide room for the handle 23, the distance between the upper edges of the front and rear walls 20 and 21 must be substantially less than the depth of the cabinet lining. In order to make the maximum use of the allowable space provided for the vegetable pan and still permit the handle 23 to project forwardly, the front wall 20 of the pan is inclined upwardly and rearwardly, as shown in Figures 4 and 5, with the foremost part of the front wall 20 substantially directly beneath the front edge of the handle 23. Thus it will be seen that the vegetable pan is so designed as to substantially completely fill the space provided for the pan in the refrigerator, and the only part that is lost by providing the forwardly projecting handle is in the small triangular portion immediately below the handle.

At the same time, the inclination of the front wall 20 enhances the appearance of the refrigerator interior as the vegetable pans cover up most of the bottom wall. This elminiates the appearance of a pocket or recess which would be evident if the front wall of the vegetable pan 17 were vertical or inclined in the opposite direction.

In order to support and guide the pans 17 and their covers 25 independently of each other within the refrigerator, a pair of oppositely arranged identical side supports 26 and an intermediate support 27 are provided. The side supports 26 are elongated metal strips of angular cross-section having vertical flanges 28 and horizontal flanges 29. The free edges of the horizontal flanges 29 are depressed below the remainder thereof to provide vertically spaced upper and lower ledges 31 and 32. A pair of lugs 30 are struck out from one flange of each support and bent into a vertical position, as shown in Figure 3. The vertical flanges 28 of the supports are secured to the side walls 11 of the refrigerator by any suitable means.

The intermediate support 27 comprises an upstanding post 33 secured at its lower end to the bottom wall 13 of the refrigerator lining. Mounted on the post is an elongated supporting and guiding strip 34. The strip 34 has down turned end flanges 35 and 36 which are secured by any suitable means to the front wall of the post 33 and the rear wall 12 of the refrigerator lining, respectively. The free side edges of the strip 34 are depressed slightly below the level of the intermediate portion 38 to provide a pair of longitudinally extending ledges 37.

A cover supporting strip 39 having upturned end flanges 40 rests on and is secured to the intermediate portion 38 of the strip 34. The strip 39 is substantially as long as the strip 34 and is provided intermediate its ends and midway between its edges with upstanding spacing lug 41.

Each vegetable pan 17 is supported within the refrigerator by means of the side flanges 22 which rest on the upper surfaces of the ledges 38 and 37. The pan is held against lateral movement by means of the upstanding walls joining the ledges 31—32 and 37—38 respectively.

The covers 25 are supported on the ledges 31 and the upper surface of the strip 39 and are prevented from moving laterally by means of the lugs 30 and 41. Accidental removal of the covers 25 is prevented by the upstanding flanges 40 at the ends of the strip 39, but the covers may be readily removed by lifting their front ends sufficiently to clear the flanges 40 and pulling them from the refrigerator. The vegetable pans are removed by sliding them longitudinally on the ledges 32 and 37.

In order to prevent either the covers 25 or the pans 17 striking the back wall 12 with such force as would injure either of these parts, there is secured to the back wall a resilient stop or bumper 42. This stop is preferably formed of rubber and includes an overhanging lip 43 which serves to hold the covers 25 down in proper place when they are installed. As shown, two stops 42 are employed, one for each pair of pans and covers. The stops are preferably secured in place by insertion in openings provided for that purpose in the back wall 12 of the inner liner.

From the foregoing it will be evident that this invention provides a novel vegetable pan of enhanced appearance, which has a very large capacity for a pan of such overall outside dimensions. Also, the supporting means provides for easy removal of either the pan or the cover independently of the other. By removing one pan and its cover and placing the same on top of the other pan, an unobstructed storage space of relatively great height may be provided at one side of the refrigerator.

The scope of the invention is indicated in the appended claims.

I claim:

1. In a refrigerator cabinet, a substantially rectangular receptacle, a removable cover for said receptacle, means for supporting said receptacle for sliding movement into and out of said cabinet, additional means for supporting said cover immediately above said receptacle whereby said receptacle may be removed from said cabinet independently of said cover, and resilient means secured to a wall of the cabinet for engaging the receptacle and holding the cover in place over the receptacle.

2. In a refrigerator cabinet, a pair of substantially rectangular receptacles located side by side within said cabinet, a removable cover for each receptacle, means for supporting said receptacles and covers within said cabinet including an upstanding post secured to the bottom wall of the cabinet intermediate said receptacles, an elongated supporting strip secured at one end to said post and at its other end to the rear wall of the cabinet, said strip having its side edges depressed below the level of its central portion to support and guide the adjacent edges of said receptacles, and a cover supporting strip secured to the central portion of said first mentioned strip, said cover supporting strip having upturned ends for engagement with the ends of said covers, and an upstanding separator intermediate its lateral edges to space the covers from each other.

3. In a refrigerator cabinet, a pair of substantially rectangular receptacles located side by side within said cabinet, a removable cover for each receptacle, means for supporting said receptacles and covers within said cabinet including an upstanding post secured to the bottom wall of the cabinet intermediate said receptacles, an elongated supporting strip secured at one end to said post and at its other end to the rear wall of the cabinet, said strip having its side edges depressed below the level of its central portion to support and guide the adjacent edges of said receptacles, means on the central portion of said strip for supporting the adjacent edges of said covers above the corresponding receptacles, said last named means including a separator between said covers to space the latter from each other.

4. In a refrigerator cabinet, a pair of substantially rectangular receptacles located side by side within said cabinet, a removable cover for each receptacle, means for supporting said receptacles and covers within said cabinet including an upstanding post secured to the bottom wall of the cabinet intermediate said receptacles, an elongated supporting strip secured at one end to said post and at its other end to the rear wall of the cabinet, said strip having its side edges depressed below the level of its central portion to support and guide the adjacent edges of said receptacles, means on the central portion of said strip for supporting the adjacent edges of said covers above the corresponding receptacles, said last named means including upstanding abutments at the front and rear ends of said strip for engagement with the ends of said covers.

5. In a refrigerator cabinet, a pair of substantially rectangular receptacles arranged side by side within the cabinet, removable cover means for said receptacles, and means for supporting said receptacles and cover means within said cabinet, said supporting means including an upstanding post secured to the bottom wall of the cabinet intermediate said receptacles and an elongated supporting strip secured at one end to said post and at its other end to a wall of the cabinet, said strip having a central portion supporting said cover means and depressed side edge portions supporting and guiding the adjacent edges of the receptacles below the cover means.

OSCAR E. NORBERG.